May 8, 1962

L. JULIE 3,033,968

PRECISION TEMPERATURE-REGULATED OVEN SYSTEM AND METHOD OF CONTROL

Filed Nov. 7, 1958

INVENTOR
LOEBE JULIE
BY
Curtis, Morris & Safford
ATTORNEYS

Fig. 5.
PRIOR ART
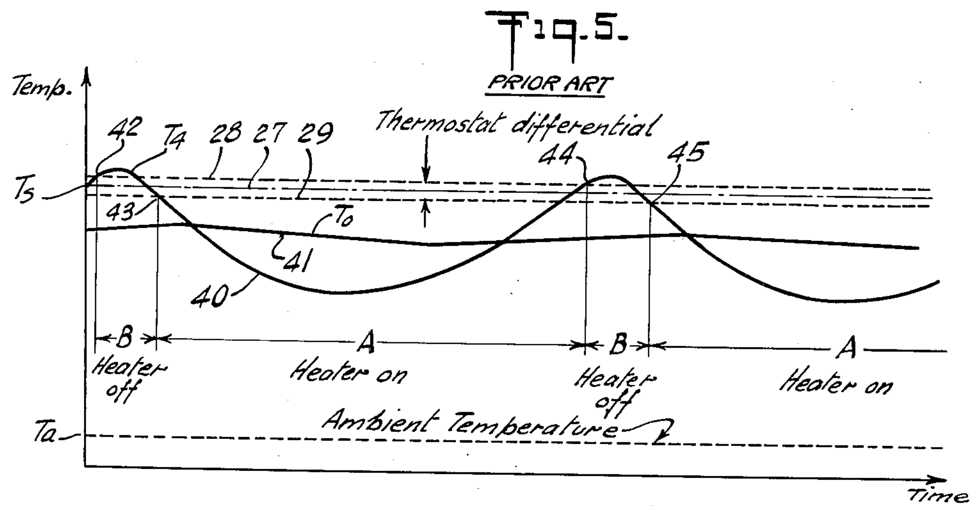
Fig. 6.
PRIOR ART
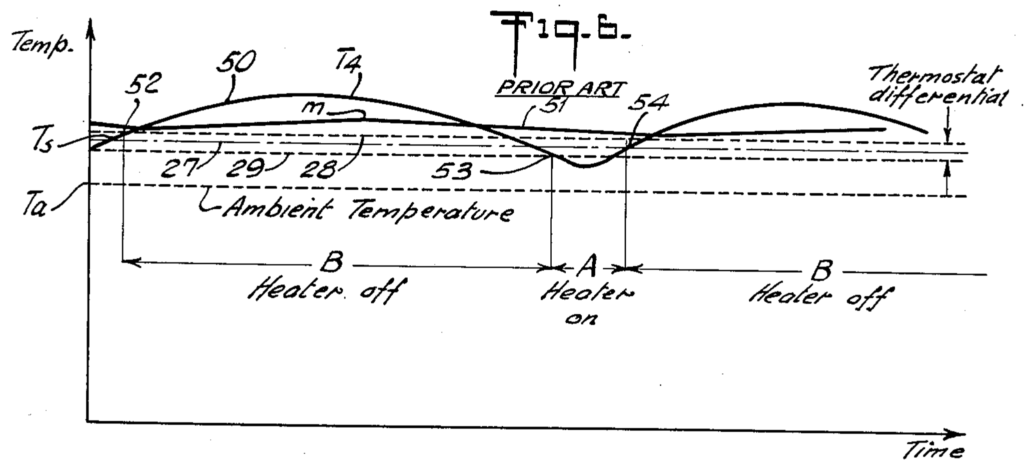
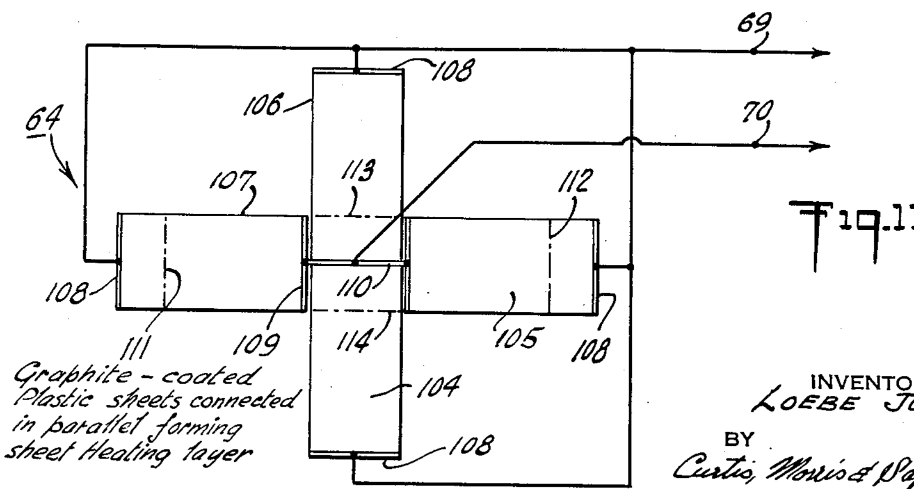
Fig. 11
INVENTOR
LOEBE JULIE
BY
Curtis, Morris & Safford
ATTORNEYS.

INVENTOR
LOEBE JULIE
BY
Curtis, Morris & Safford
ATTORNEYS

United States Patent Office 3,033,968

Patented May 8, 1962

1

3,033,968

PRECISION TEMPERATURE-REGULATED OVEN SYSTEM AND METHOD OF CONTROL

Loebe Julie, New York, N.Y., assignor to Julie Research Laboratories, Inc., New York, N.Y.

Filed Nov. 7, 1958, Ser. No. 772,514
16 Claims. (Cl. 219—20)

This invention relates to a precision temperature-regulated oven system and method of control. More particularly, the invention relates to such an oven system having a uniform sheet resistance heating layer surrounding the oven beneath an outer insulation layer and forming an isothermal boundary enclosure effectively providing an artificial ambient for the oven interior and effectively isolating the interior of the oven from actual ambient conditions. The temperature of all of the elemental areas of this sheet heating layer is made almost exactly the same by virtue of a uniform input of heat power to all areas. This sheet heating layer is maintained at a temperature level just slightly below the desired temperature at the interior of the oven. A very small amount of additional heat is injected into the interior of the oven for establishing and maintaining the desired temperature there.

In the method of control of the present invention a uniform input of heat power is supplied to all elemental areas of a boundary area about the oven. This uniform heat input per unit area provides an isothermal enclosure creating effectively an artificial ambient for the oven interior. The temperature of this isothermal enclosure is sensed and the power supplied to it is controlled to maintain its temperature just slightly below the desired level within the interior of the oven. Also, a precision sensing of the interior temperature is made, and a small amount of additional heat power is fed into the interior to hold it at the desired value.

In making precision measurements and calibrations of various kinds, there is often a need to hold constant the temperature of one element involved. For example, in taking precise electrical measurements or tests a standard cell may be used. Its temperature must be held fixed because its voltage output changes with temperature. The over-all accuracy of the determinations being made is directly affected by any uncertainty in the temperature of the standard cell. Similarly, in other types of measurements, the accuracy of the results may depend upon the uncertainty in the temperature of some standard element.

For purposes of maintaining a standard element, such as a primary standard cell, at a constant temperature it is customarily placed in the interior of a temperature-regulated oven. Then, the oven is controlled by a precision thermostat to maintain its interior at the temperature level desired.

When utilizing precision ovens of the prior art the temperature within the interior of the oven is found to drift away from the thermostat setting in response to changes in the ambient temperature. The amount of this uncertainty in the operating temperature varies with changes in the ambient temperature.

Among the advantages of the precision oven system and method of control of the present invention are those resulting from the fact that the uncertainty of the operating temperature within the oven is greatly reduced below that obtainable in prior art ovens of comparable size and weight. Moreover, this marked improvement in operating characteristics is obtained while enablng the elimination of one of the thick-walled metal shells utilized in prior ovens of comparable size.

In this specification and in the accompanying drawings, are described and shown a precision temperature-regulated oven system and method of control embodying

2 my invention and various modifications thereof are indicated, but it is to be understood that these are not intended to be exhaustive nor limiting of the invention, but on the contrary are given for purposes of illustration in order that others skilled in the art may fully understand the invention and the manner of applying the control method and oven system in practical use so that they may modify and adapt it in various forms, each as may be best suited to the requirements of a particular use.

The various objects, aspects, and advantages of the present invention will be more fully understood from a consideration of the following specification in conjunction with the accompanying drawings, in which.

Figure 1:
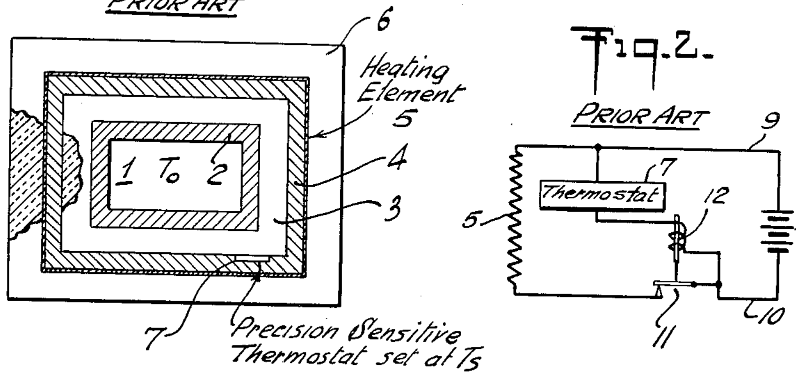
FIGURE 1 is a schematic cross-sectional view of a typical precision oven of the prior art.
Figure 4:
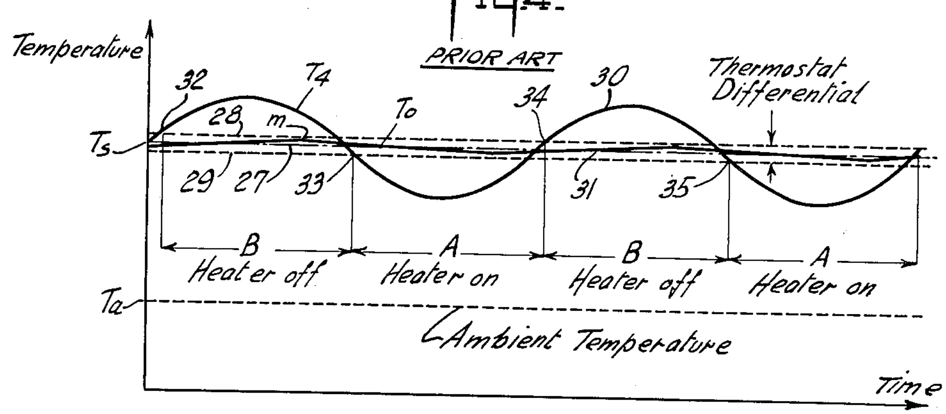
Figure 7:
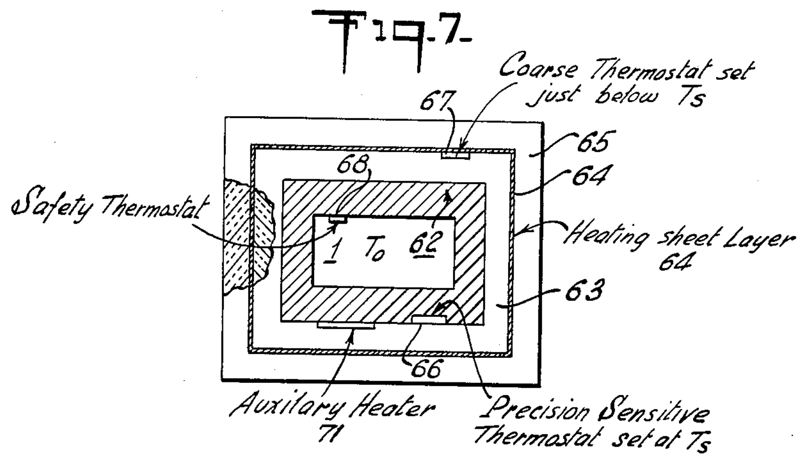
Figure 8:
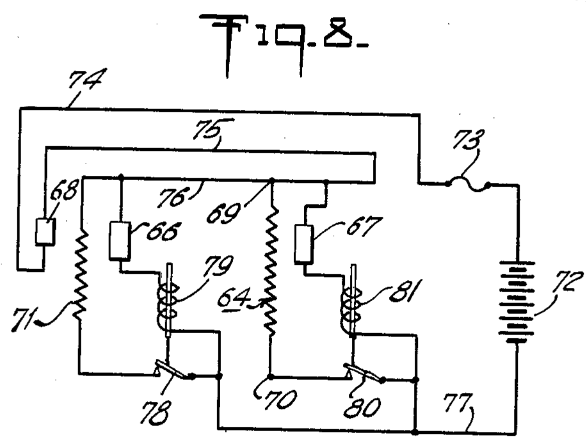
Figure 10:
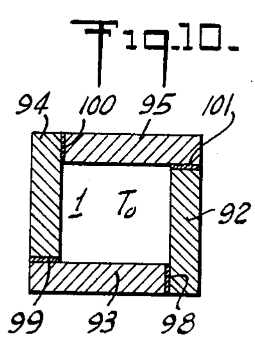
Figure 9:
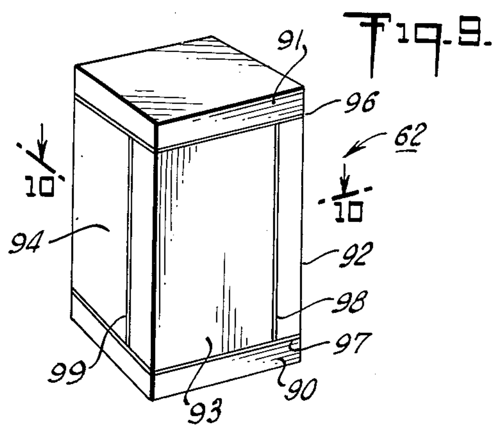

FIGURES 4, 5, and 6 are graphs presented for purposes of explaining shortcomings of the prior art and which are helpful in explaining advantages of the present invention. These graphs show heater temperature and operating temperature as functions of time for various ambient temperatures;

FIGURE 7 is a schematic cross sectional view corresponding generally to that of FIGURE 1 but illustrating an oven system and method of control embodying the present invention;

FIGURE 8 is a schematic electrical circuit diagram of the controls for the oven system of FIGURE 7;

FIGURE 9 is a perspective view of the thick-walled metal box surrounding the interior region of the oven system of FIGURE 7;

FIGURE 10 is a plan cross-sectional view taken along the line 10—10 of FIGURE 9; and FIGURE 11 illustrates a uniform sheet resistance heating layer as shown at 64 in FIGURE 7.

In typical precision temperature-regulated ovens of the prior art, the interior region 1 is surrounded by an inner thick-walled metal shell or box 2 formed of metal of good heat conductivity. A first layer of insulation 3 surrounds the box 2 and is in turn surrounded by a second similar metal shell or box 4. Heat is supplied to the exterior of the box 4 by a heating element 5 which is surrounded by an outer insulation layer 6. There is also an outer protective cover around the oven as will be understood, but this is not illustrated for purposes of making the drawings more easily readable.

In order to control the operating temperature $T_o$ within the oven interior 1 a precision sensitive thermostat 7 measures the temperature of the metal box 4. This thermostat is set at a temperature level $T_s$, and it is desired to maintain the operating temperature $T_o$ in the interior 1 of the oven the same as the set temperature $T_s$. These precision thermostats are available commercially today having temperature differentials in their on-to-off and off-to-on operating point of less than 0.01° centigrade.

Figure 2:
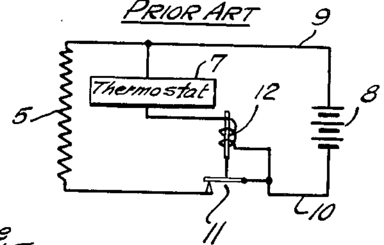
FIGURE 2 is a schematic electrical circuit diagram of a typical control circuit of the prior art for use with the oven of FIGURE 1.

As shown in FIGURE 2, the heating element is energized through leads 9 and 10 from an electrical source 8. The contacts 11 of a relay 12 are opened and closed in response to the action of the thermostat 7 so as to control the "on" and "off" periods of the heater 5.

In order to explain the advantages of this invention I find that it is helpful to consider the following analysis of the operation of the prior art oven of FIGURES 1 and 2. The average power which is supplied to the heater 5 over a length of time is the rated heater power P times the duty cycle, as follows:

$$(1) \qquad \text{Average heater power} = P \times \frac{A}{A+B}$$

where A is the length of the "on" period and B is the length of the "off" period of the heater.

Also, the average power which is required by the heater can be expressed approximately as follows in terms of the difference between the ambient temperature $T_a$ and the set temperature $T_s$. This expression below neglects heat transfers by radiation which are not important to this analysis.

$$(2) \qquad \text{Average heater power} = K\ (T_s - T_a)$$

where K is a constant of proportionality. Thus, the duty cycle can be expressed:

$$(3) \qquad \frac{A}{A+B} = \frac{K}{P}(T_s - T_a)$$

Figure 3:
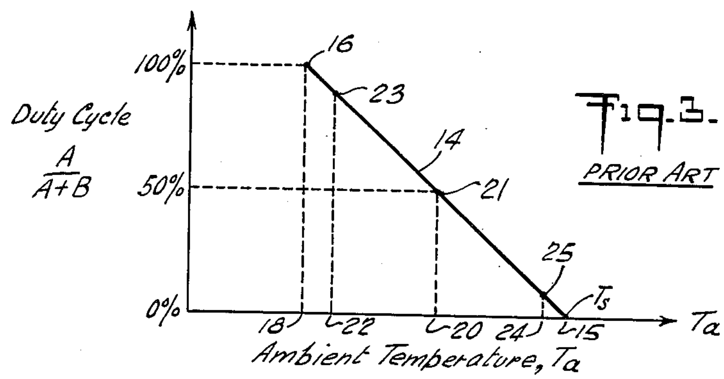
FIGURE 3 is a plot showing the effect of changes in ambient temperature upon the duty cycle of the heating element in prior art ovens such as shown in FIGURES 1 and 2.

In FIGURE 3 the duty cycle is plotted as a percentage in terms of ambient temperature so that the line 14 is a graph of Equation 3. This plot 14 is shown as zero percent when the ambient temperature $T_a$ reaches the point 15 at which $T_a$ equals $T_s$. The plot 14 continually rises as the ambient temperature $T_a$ falls, and the plot reaches 100% at the point 16 when the ambient temperature has fallen to such a low temperature point 18 as to call for continuous operation of the heater.

For purposes of analysis it is convenient first to assume that the ambient temperature $T_a$ is near to a medium value 20. This medium value of ambient temperature corresponds to the point 21 of approximately a 50% duty cycle. The operational graph of FIGURE 4 is drawn to illustrate what happens in the prior art when this approximate 50% duty cycle appears. In this graphical presentation the curve 30 represents the temperature $T_4$ of the metal box 4 at the position of the precision thermostat 7. This temperature $T_4$ swings up and down about an average value because of the relatively large thermal mass of the box 4 in conjunction with the on-off cycling of the heater 5.

In FIGURE 4 the dash and dot line 27 represents the set temperature $T_s$ of the thermostat, and the dotted lines 28 and 29 represent the upper and lower limits of the temperature differential of the thermostat, which may be, for example, somewhat less than 0.01° C. As the temperature curve of $T_4$ rises to the point 32 at the upper limit 28 of the thermostat differential the heater relay contacts are opened and the heater "off" period B commences. Because of the excess heat in the heater at the moment it is turned off and the thermal mass of the box 4, the curve of $T_4$ continues to rise for some time, and then later it falls to the point 33 at the lower limit 29 of the thermostat differential.

At the instant that point 33 is reached the next heater "on" period A commences. However, the curve 30 continues to fall for some time because the heater is now cool, and it takes appreciable time for the heater to offset the heat loss trend of the large thermal mass of box 4. After a while the temperature curve of $T_4$ again climbs to point 34 at the upper limit 28 of the thermostat differential, and the heater "off" period begins again. Then later on the point 35 is reached, and the next period A commences, and so forth.

It will be appreciated that the layer of insulation 3 in conjunction with the thermal mass of the inner box 2 act as a smoothing filter for the thermal changes $T_4$. Hence, the operating temperature $T_o$ as shown by the curve 31 is maintained relatively smooth. There is a slight rise and fall in the curve 31, but in typical prior ovens these cyclic changes in $T_o$ are less than the differential between 28 and 29. Any maximum points *m* which occur in the curve of $T_o$ lag in time behind the corresponding maximum point of the $T_4$ curve because of the filtering action of the insulation 3 and the inner box 2. Under the particular ambient conditions shown in FIGURE 4, the temperature $T_o$ is found to average out at $T_s$, which is the desired result.

However, the important factor to note in FIGURE 4 is that the curve of $T_o$ results from an averaging of the temperature curve of $T_4$. Because a duty cycle near the midpoint was assumed, the average of $T_o$ did happen to be in the desired alignment with $T_s$.

When the ambient temperature falls (please see FIGURE 3 again) to a point such as 22 which corresponds with the operating point 23 of approximately a 90% duty cycle, then curves of the type shown in FIGURE 5 are found to apply. In FIGURE 5 the dotted ambient temperature line $T_a$ is placed relatively much farther below $T_s$ than in FIGURE 4 because of the assumed drop in ambient temperature.

During operation as the temperature $T_4$ of the outer shell 4 reaches the point 42 on the upper limit line 28, the heater "off" cycle B begins. Because of the relatively lower ambient temperature, there is now a greater rate of heat loss from the box 4. Thus, the curve 40 of temperature $T_4$ is seen to rise only a slight distance above the limit line 28. It very soon bends down and reaches the point 43 on the lower limit line 29, turning the heater "on." To counteract the relatively greater rate of heat loss from box 4 mentioned above, the "on" period A is extended, and the curve 40 sweeps down for a relatively long period before turning up. When the curve 40 finally reaches the point 44, the heater is again turned off for only a relatively brief period until the point 45 is reached, and so forth.

Under these conditions of a low ambient as shown in FIGURE 5, the operating temperature $T_o$ is found to be located along the curve 41, representing an averaging between the highs and lows of the $T_4$ curve 40. The curve 41 is almost as smooth as the curve 31, but this curve 41 is now a substantial distance below the set temperature $T_s$. In fact, the displacement or shift of curve 41 below $T_s$ is approximately one-half of the difference between the highs and the lows of $T_4$, when there is a 90% duty cycle such as shown in FIGURE 5. This displacement of curve 41 away from $T_s$ represents an uncertainty in $T_o$ produced by the operation of the prior art ovens.

When the ambient temperature as seen in FIGURE 3 has risen to a value 24 corresponding to the operating point 25 having approximately a 10% duty cycle, then operating curves of the type shown in FIGURE 6 apply. The result is to cause curve 51 of the operating temperature $T_o$ to drift above the set temperature $T_s$. The manner in which this uncertainty occurs is shown in FIGURE 6.

As the curve 50 of temperature $T_4$ passes through the point 52 on the upper limit 28 the heater is turned off and remains off for the period B while the curve 50 rises and then falls gradually due to the thermal inertia of the box 4 and the relatively smaller temperature differentials involved. At the point 53 the lower limit 29 is reached and the heater is turned on for a brief period A and then again turns off at the point 54. The curve 51 strikes an average between the highs and lows of the curve 50 and is found to have drifted up to a level above the upper limit 28 of the thermostat differential. This uncertainty in $T_o$ is not so large as in the case of FIGURE 5, but nevertheless is a disturbing influence in precision measurements and calibrations.

In summary, it is seen that while the interior temperature $T_o$ of prior art ovens may be held to a smoothness which varies less than the spread between the limits of the temperature differential of the thermostat, nevertheless there is an uncertainty in the precise level of $T_o$ caused by changes in ambient temperature. This uncertainty in $T_o$ is in fact several times larger than the thermostat differential and may amount almost to one-half of the difference between the highs and lows of the temperature excursions of the outer metal shell or box 4.

FIGURES 7 and 8 show an illustrative example of a precision oven system and method of control embodying this invention and which greatly reduce the uncertainty in the operating temperature $T_o$ of the oven interior. Surrounding the interior 1 is a thick-walled metal box 62 as shown in detail in FIGURES 9 and 10. The walls of this box are formed of metal of good heat conductivity and in this example are formed of aluminum one inch thick, the details of construction being described further below. Around this box 62 is an inner insulation layer 63 formed of a light-weight good heat insulation material such as bubble-type polystyrene plastic, for example, which can be obtained commercially from Dow Chemical Co. under the trademark "Styrofoam."

Surrounding the insulation 63 is a uniform sheet heating resistance layer 64 forming an isothermal boundary and having an outer layer of insulation 65. There is also an outer protective cover, not shown, which may for example be of wood. A precision sensitive thermostat 66 is placed adjacent to the outer surface of the box 62 and controls the small amount of heat input which is supplied to an auxiliary heater 71 also mounted on this box. By virtue of the fact that the heat conductive walls of the box 62 are so thick, they provide a high thermal conductivity between every point throughout the box. They maintain the temperatures everywhere the same within a difference of less than 0.002° C. Because of this high conductivity relationship the auxiliary heater 71 can be in the form of a small localized heating element mounted near the center of one wall of the box 62.

The heat injected by the localized auxiliary heater 71 is so small that any temperature gradients across the box 62 from one side to the other produced by heater 71 are negligible. Advantageously, the precision sensitive thermostat 66 is placed on the same wall of the box 62 in close proximity to the auxiliary heater. Thus, this thermostat provides a type of anticipatory control because it immediately responds to the very slight localized changes in temperature in the exterior surface of the one wall. The precision thermostat used in this example is a mercury regulator such as is available commercially from Philadelphia Scientific Glass Company under the designation TH 606AX and has a temperature setting of 37° C.

A coarse thermostat 67 which is set at a temperature slightly below $T_s$, for example at 36° C., is placed directly against the surface of the sheet heating layer 64 on the opposite side of the oven from the precision thermostat. This coarse thermostat may have a differential of approximately ½ of a degree C. It may be of the bimetallic type, but I prefer to use a mercury regulator having a differential of about ½° C.

Also, a normally-closed safety or protective thermostat 68 is placed within the interior. It is set at 45° C. and shuts off all power to the oven in the event the interior temperature should rise to 45° C.

As shown in FIGURE 8 the sheet heater 64 and the auxiliary heater 71 are energized from a source 72, for example a 24-volt battery. One terminal of this battery is connected through a fuse 73 and a lead 74 to one side of the normally closed safety thermostat 68 and from there through a lead 75 to a line 76 connected to each of the heaters 64 and 71. The other battery terminal is connected by a lead 77 to the normally closed contacts 78 and 80 of the relays 79 and 81, respectively, which complete the circuits to the heaters 64 and 71. The precision thermostat 66 controls the relay 79, and the coarse thermostat 67 controls the relay 81.

The thick-walled box 62 may be fabricated in any suitable fashion such as by casting, but I find that it is convenient to assemble it as shown in FIGURE 9. Its outside dimensions are 5 inches by 5 inches by 8½ inches in height. The base 90 and top 91 are square aluminum slabs 1 inch thick, and the side walls are formed by four rectangular slabs 92, 93, 94, and 95, which are 1 inch thick and measure 4 inches by 6½ inches. These slabs are bolted together in a pattern as shown in FIGURES 9 and 10. In order to increase the thermal conductivity by assuring tight metal-to-metal contact at the joints, thin lead shims 96, 97, 98, 99, 100, and 101 are inserted. These shims are 1/32 of an inch thick and the assembly bolts, not shown, are drawn up tightly to seat the aluminum surfaces firmly against the shims.

For providing a uniform sheet resistance heating layer I find advantage in using the construction shown in FIGURE 11. Four rectangular sheets 104, 105, 106, and 107 of durable water-repellent plastic material are arranged as shown and uniformly coated with graphite. These strips measure 7 x 14 inches. A suitable plastic material is polyester film, for example such as is available under the trademark "Mylar" from E. I. du Pont de Nemours & Co.

In order to make contact with the respective outer ends of each sheet a copper strip 108 is cemented thereto by silver cement such as can be obtained commercially from Handy and Harmon in New York, New York. Similarly, strips 109 are cemented to the inner ends of the sheets 105 and 107, and a single transverse strip 110 is connected between the two strips 109 and is cemented to both of the sheets 104 and 106. These sheet resistances 105, 106, 107 and 108 are all connected in parallel between the connection points 69 and 70.

The way in which this sheet heater is wrapped around the outside of the 1-inch thick insulation layer 63 is indicated by dotted lines 111, 112, 113, and 114. The center of the bottom of the layer 63 rests at the center of the strip 110, and the 90° folds 113 and 114 are located at the bottom corners, with the outer portions of sheets 104 and 106 extending up opposite sides. The strips 109 are at the other two bottom corners, with the sheets 105 and 107 extending up the other two sides and having 90° folds at 111 and 112 so that the ends 108 of sheets 105 and 107 meet at the center of the top.

A suitable way to apply the graphite coating is to spray on a concentrated colloidal dispersion of pure electric-furnace graphite in water to produce a uniform coating having a resistance of 100 ohms between the respective ends of each sheet. A suitable colloidal dispersion can be obtained under the trademark "Aquadag" from the Acheson Colloids Co. of Port Huron, Michigan.

By virtue of the symmetrical arrangement approximately the same thermal losses occur from each elemental area of the layer 64 when it is in operation. The uniformity of this sheet heater 64 and the uniform heat power input provided to each area of this sheet heater layer 64 create an isothermal enclosure at a temperature which is just slightly below $T_s$. It will be appreciated that the sheet enclosure 64 has very little thermal inertia, and thus the thermostat 67 can hold its temperature very closely to the range of the thermostat differential.

In effect, the sheet heater layer enclosure 64 creates an artificial ambient condition for the box 62 advantageously isolating the interior of the oven from ambient temperature changes.

A very suitable way in which to arrange the precision thermostat 66 is to mount it in a hole drilled into the wall of the box 62 at a position in close physical proximity with the auxiliary heater 70 which is adhesively fastened to the outside of box, for example by pressure-sensitive tape such as adhesive or cellophane tape.

In a commercially available precision oven system and method as described the temperature $T_o$ is held constant within an uncertainty of less than 0.003° C. while the ambient temperature varies anywhere in the range from 15° C. up to 35° C. The National Bureau of Standards has certified that this oven system as described when containing an Eppley Type 1-volt standard cell has maintained the output voltage constant to within 0.5 microvolt under the test procedures.

From the foregoing it will be understood that the precision temperature-regulated oven system and method of control of the present invention described above are well suited to provide the advantages set forth, and since many possible embodiments may be made of the various features of this invention and as the method and apparatus herein described may be varied in various parts, all without departing from the scope of the invention, it is to be understood that all matter hereinbefore set forth or shown in the accompanying drawings is to be interpreted as illustrative and not in a limiting sense and that in certain instances, some of the features of the invention may be used without a corresponding use of other features, all without departing from the scope of the invention.

I claim:

1. The method of controlling the desired interior temperature of a precision oven comprising the steps of supplying heat power at a uniform rate per unit area to a boundary layer enclosure of very little mass and having low thermal inertia surrounding the interior of the oven, sensing the temperature of said boundary layer, regulating the heat power fed to said boundary layer in accordance with said sensing so as to maintain its temperature just slightly below the desired interior temperature, injecting small amounts of heat power to the interior to raise its temperature slightly above that of the boundary layer enclosure of low thermal inertia, sensing the temperature of said interior, and regulating the small heat power supplied to said interior in accordance with said second sensing so as to maintain the desired interior temperature.

2. A precision temperature-regulated oven system for maintaining a desired temperature throughout a predetermined region comprising a box having walls of high heat conductivity surrounding said region, first heating means in heat exchange relationship with said box, precision thermostat means for sensing the temperature of said box and arranged to control the heat supplied by said first heating means, thermal insulation surrounding said box, a uniform heating sheet resistance layer surrounding said insulation, second thermostat means for sensing the temperature of said resistance layer and arranged to control the heating of said resistance layer for maintaining its temperature below the desired temperature, and thermal insulation surrounding said resistance layer.

3. A precision oven system as claimed in claim 2 and wherein said first heating means is a small localized resistance heater closely adjacent to said box and said precision thermostat means senses the temperature of a portion of the box closely adjacent to said localized heater.

4. A precision oven system as claimed in claim 3 and wherein said localized heater is mounted on the exterior surface of said box and said precision thermostat means is inserted into a hole in the wall of the box behind the surface on which the localized heater is mounted.

5. A precision temperature-regulated oven comprising a box of good heat conductivity, electrical resistance means for heating said box, first thermostatic control means responsive to the temperature within said box for controlling the heating of said electrical resistance means to maintain a predetermined desired temperature level in said box, a layer of heat insulation material around the box, a uniform resistance sheet heating layer enclosing said heat insulation material, second thermostatic control means responsive to the temperature of said uniform resistance sheet for controlling the heating of said sheet, said second thermostatic means having a temperature control level just slightly below that of said first thermostatic control means, and a layer of heat insulation material around said heating layer, whereby said second thermostatic control means maintains said uniform resistance sheet heating layer at a temperature just slightly below the desired temperature level within said box.

6. A precision oven as claimed in claim 5 and wherein said uniform resistance sheet heating layer comprises a thin sheet of plastic coated with graphite.

7. A precision temperature-regulated oven system for maintaining a desired temperature within a predetermined region comprising a box having thick walls of metal of good heat conductivity surrounding said region, first heating means in heat exchange relationship with said box, a precision thermostat set at the desired temperature level and sensing the temperature of the walls of said box for controlling said first heating means, insulation material around said box, area-type heating means of low thermal inertia uniformly heating the exterior surface of said insulation material for creating an artificial ambient environment for said box at a temperature level just below said desired temperature, and a second thermostat sensing the temperature of said area-type heating means for maintaining said artificial ambient environment.

8. A precision temperature-regulated oven system as claimed in claim 7 and wherein said area-type heating means is a thin sheet resistance, said second thermostat being positioned adjacent to said thin sheet resistance.

9. A precision temperature-regulated oven system as claimed in claim 7 and wherein said second thermostat is on the opposite side of the oven from said precision thermostat.

10. A precision temperature-regulated oven system as claimed in claim 7 and wherein the walls of said box are approximately one inch thick.

11. A precision temperature-regulated oven system including a box having walls of a material of good heat conductivity, a localized resistance heating element near the outside of said box, a precision thermostat near said element and sensing the temperature of the box, a layer of heat insulation material surrounding the box, a uniform sheet resistance layer surrounding said insulation and comprising a cross-shaped sheet of uniform resistance material formed by four identical resistance sheets having conductive strips across their respective ends and being connected in parallel, said cross-shaped sheet being wrapped around the insulation layer, a second thermostat adjacent to said sheet resistance layer for sensing its temperature and being set at a temperature below the setting of said precision thermostat, and a layer of heat insulation material surrounding said sheet resistance layer.

12. A precision temperature-regulated oven system for maintaining precisely a desired temperature within the interior region of the oven comprising a thick-walled metal box enclosing the interior region of the oven and formed of metal of good heat conductivity, first heating means in heat exchange relationship with said thick-walled box, precision thermostat means for sensing the temperature of said thick-walled box for controlling the heat supplied by said first heating means, uniform heat supplying means of low thermal inertia enclosing and spaced from said thick-walled box and having uniform heat power input to all areas thereof for providing a heated isothermal enclosure of low thermal inertia about said thick-walled box, second thermostat means responsive to the temperature of said uniform heat supplying means for controlling the heat power input thereto, said second thermostat means being set at a temperature below the setting of the precision thermostat means, first thermal insulation means beneath said uniform heat supplying means and enclosing said box, and second thermal insulation means surrounding said uniform heat supplying means, whereby said uniform heat supplying means provides an isothermal enclosure of low thermal inertia for effectively isolating the interior of the oven from ambient temperature changes.

13. A precision temperature-regulated oven system comprising a symmetrical thick-walled box of metal of good heat conductivity, a uniform layer of heat insulation material surrounding the box, uniform heat supplying means of low thermal inertia surrounding the insulation layer, and a second uniform layer of heat insulation surrounding said heat supplying means, said uniform heat supplying means including a uniform resistance sheet wrapped around said first insulation layer and a thermostat directly sensing the temperature of said uniform heat supplying means for controlling the electrical heating of said uniform heat supplying means for creating effectively a heated isothermal enclosure of low thermal inertia surrounding the first insulation layer.

14. A precision temperature-regulated oven system comprising a first layer of thermal insulation material surrounding the interior of the oven, uniform area film type resistor means of electrical resistance of low thermal inertia adjacent to and surrounding said first insulation layer, electrical means for supplying uniform heat power input per unit area of said uniform area resistor means, a second insulation layer adjacent to and surrounding said uniform area resistor means, and control means for sensing the temperature of said uniform area resistor means for controlling the heat power input thereto.

15. A precision temperature-regulated oven system comprising a first layer of thermal insulation material surrounding the interior of the oven, uniform area film type resistor means of low thermal inertia surrounding said first layer of insulation having a cross shape and including a plurality of identical resistance areas extending around and enclosing said first insulation layer, electrical connections to said plurality of resistance areas for supplying uniform heat power input per unit area thereof, a second insulation layer adjacent to and surrounding said uniform area resistor means, and control means responsive to the temperature changes of said uniform area film type resistor for controlling the heat power input thereto.

16. A precision temperature-regulated oven system comprising a first layer of thermal insulation material surrounding the interior of the oven, uniform area resistor means of electrical resistance of low thermal inertia adjacent to and surrounding said first insulation layer, electrical means for supplying uniform heat power input per unit area of said uniform area resistor means, a second insulation layer adjacent to and surrounding said uniform area resistor means, said uniform area resistance means being sandwiched between said first and second layers of thermal insulation material, and thermostat control means directly engaging said uniform area resistor means for sensing the temperature of said uniform area resistor means for controlling the heat power input thereto.

References Cited in the file of this patent

UNITED STATES PATENTS

| | | |
|---|---|---|
| 1,803,282 | Morgan | Apr. 28, 1931 |
| 1,967,185 | Clapp | July 17, 1934 |
| 1,991,276 | Gebhard | Feb. 12, 1935 |
| 2,438,345 | Miller | Mar. 23, 1948 |
| 2,472,612 | Poland | June 7, 1949 |
| 2,515,294 | Cowgill | July 18, 1950 |
| 2,747,069 | Miller | May 22, 1956 |